(12) United States Patent
Kubo

(10) Patent No.: US 7,995,271 B2
(45) Date of Patent: Aug. 9, 2011

(54) LASER MICROSCOPE WITH NEGATIVE DISPERSION OPTICAL SYSTEM

(75) Inventor: Hirokazu Kubo, Hino (JP)

(73) Assignee: Olympus Corporation, Tokyo (JP)

( * ) Notice: Subject to any disclaimer, the term of this patent is extended or adjusted under 35 U.S.C. 154(b) by 408 days.

(21) Appl. No.: 12/106,615

(22) Filed: Apr. 21, 2008

(65) Prior Publication Data

US 2008/0259445 A1 Oct. 23, 2008

(30) Foreign Application Priority Data

Apr. 23, 2007 (JP) ................................. 2007-113042

(51) Int. Cl.
*G02B 21/06* (2006.01)
(52) U.S. Cl. ......................................... 359/385; 385/52
(58) Field of Classification Search .................. 359/385; 385/52
See application file for complete search history.

(56) References Cited

U.S. PATENT DOCUMENTS

| | | | | |
|---|---|---|---|---|
| 4,720,163 A * | 1/1988 | Goodwin et al. | ............... | 385/90 |
| 5,933,274 A * | 8/1999 | DeSimone | .................... | 359/390 |
| 5,995,281 A * | 11/1999 | Simon et al. | .................. | 359/368 |
| 6,178,041 B1 | 1/2001 | Simon | | |
| 6,814,503 B2 * | 11/2004 | Hall et al. | ........................ | 385/91 |
| 6,855,941 B1 * | 2/2005 | Tomioka | .................... | 250/483.1 |
| 6,943,944 B2 * | 9/2005 | Suzuki | ........................... | 359/385 |
| 2003/0007145 A1 | 1/2003 | Shimada | | |
| 2005/0035281 A1 * | 2/2005 | Mehner et al. | ................ | 250/234 |
| 2005/0279950 A1 | 12/2005 | Kawano et al. | | |
| 2007/0098028 A1 * | 5/2007 | Alcock et al. | ........... | 372/29.015 |

FOREIGN PATENT DOCUMENTS

DE 19622359 A1 12/1997
EP 1278092 A2 1/2003

OTHER PUBLICATIONS

S.W. Clark et al; Fiber Delivery of Femtosecondpulses From a Ti:sapphire laser; Optics Letters, vol. 26, No. 17, Sep. 1, 2001; pp. 1320-1322.
McConnell, G. et al "Two-photon laser scanning fluorescence microscopy using photonic crystal fiber", Journal of Biomedical Optics SPIE USA vol. 9, No. 5, Sep. 2004, pp. 922-927, XP002486283, ISSN: 1083-3668.
Wolleschensky, R. et al "Characterization and optimization of a laser-scanning microscope in the femtosecond regime", Applied Physics B (lasers and optics) Springer-Verlag, Germany, vol. B67, No. 1, Jul. 1998, pp. 87-94, XP002486284, ISSN: 0946-2171.
Extended European Search Report dated Jul. 18, 2007, issued in a counterpart European Application.

* cited by examiner

*Primary Examiner* — Mark Consilvio
(74) *Attorney, Agent, or Firm* — Holtz, Holtz, Goodman & Chick, PC

(57) ABSTRACT

A laser microscope is provided which includes a laser light source, a first optical fiber through which the ultrashort pulse laser light propagates while being positively chirped, a negative dispersion optical system that negatively chirps this propagated laser light, a second optical fiber through which the laser light that has passed through the negative dispersion optical system propagates while being positively chirped, a microscope body that further positively chirps this propagated laser light and irradiates a specimen with the resultant non-chirped ultrashort pulse laser light. The negative dispersion optical system includes a negative dispersion adjuster that adjusts the amount of negative dispersion according to the change in wavelength of the ultrashort pulse laser light outputted from the laser light source or the change in the amount of positive dispersion in the microscope body.

19 Claims, 7 Drawing Sheets

LASER MICROSCOPE WITH NEGATIVE DISPERSION OPTICAL SYSTEM

BACKGROUND OF THE INVENTION

1. Field of the Invention

The present invention relates to a laser microscope.

This application is based on Japanese Patent Application No. 2007-113042, the content of which is incorporated herein by reference.

2. Description of Related Art

A multiphoton excitation laser microscope has been known in which ultrashort pulse laser light outputted from an ultrashort pulse laser light source propagates through a first optical fiber, is introduced into a negative dispersion medium so that the laser light that has propagated through the first optical fiber is negatively chirped, propagates through a second optical fiber, and is introduced into a microscope body (see S. W. Clark et al., "Fiber delivery of femtosecond pulses from a Ti:sapphire laser.", Opt. Lett. 26, 1320 (2001), pp. 1320-1322, for example).

According to such a laser microscope, since the optical system between the output port of the second optical fiber and the microscope is relatively simple, high-power ultrashort pulse laser light can be efficiently delivered.

However, in the laser microscope described in the description of S. W. Clark et al., changing in wavelength of the ultrashort pulse laser light or replacing the objective lens in the microscope body disrupts the balance between the nonlinear effect in the first optical fiber and the nonlinear effect in the second optical fiber or changes the total amount of positive dispersion in the region from the output port of the second optical fiber to the specimen. Therefore, the objective lens in the microscope body cannot output ultrashort pulse laser light having a desired pulse width, and hence a multiphoton excitation phenomenon cannot be generated efficiently in the specimen.

BRIEF SUMMARY OF THE INVENTION

The present invention has been made in view of the above circumstances. An object of the present invention is to provide a microscope system in which a specimen can be irradiated with ultrashort pulse laser light from a microscope body even when the wavelength is changed or the amount of positive dispersion in the microscope body is changed, so that a multiphoton excitation phenomenon is generated efficiently and hence a bright fluorescence image can be acquired.

To achieve the above object, the present invention provides the following solutions:

A first aspect of the present invention is a laser microscope including a laser light source that outputs ultrashort pulse laser light, a first optical fiber through which the ultrashort pulse laser light outputted from the laser light source propagates while being positively chirped, a negative dispersion optical system that negatively chirps the laser light that has propagated through the first optical fiber, a second optical fiber through which the laser light that has passed through the negative dispersion optical system propagates while being positively chirped, a microscope body that further positively chirps the laser light that has propagated through the second optical fiber and irradiates a specimen with the resultant non-chirped ultrashort pulse laser light. The negative dispersion optical system includes a negative dispersion value adjuster that adjusts the amount of negative dispersion according to the change in wavelength of the ultrashort pulse laser light from the laser light source or the change in the amount of positive dispersion in the microscope body.

According to the first aspect of the present invention, the ultrashort pulse laser light outputted from the laser light source is positively chirped while propagating through the first optical fiber due to the positive dispersion characteristic of the fiber, is negatively chirped while passing through the negative dispersion optical system due to the negative dispersion characteristic of the optical system, propagates through the second optical fiber where the negative chirped state is reduced by the positive dispersion characteristic of the fiber, enters the microscope body, and irradiates the specimen. By adjusting the negative dispersion optical system to impart the amount of negative dispersion comparable to the amount of positive dispersion imparted in the two optical fibers and the microscope body, the microscope body can irradiate the specimen with the non-chirped ultrashort pulse laser light, so that a multiphoton excitation phenomenon is generated efficiently in the specimen and hence a bright fluorescence image can be acquired.

In this case, according to the first aspect of the present invention, when the wavelength of the ultrashort pulse laser light from the laser light source is changed or the amount of positive dispersion in the microscope body is changed, the negative dispersion value adjuster is operated to adjust the amount of negative dispersion in the negative dispersion optical system disposed between the first optical fiber and the second optical fiber. Therefore, the balance between the nonlinear effect in the first optical fiber and the nonlinear effect in the second optical fiber is maintained, and hence the pulse width of the ultrashort pulse laser light which irradiates the specimen from the microscope body can be sufficiently short.

In the first aspect described above, the laser microscope may further include a first aligner that adjusts the position where the ultrashort pulse laser light is incident on the first optical fiber and a second aligner that adjusts the position where the laser light is incident on the second optical fiber.

In such a configuration, the first and second aligners are operated to improve the laser light coupling efficiency with the first and second optical fibers, so that high-power ultrashort pulse laser light can irradiate the specimen. Further, such a configuration can prevent the high-power laser light from deviating from the cores of the first and second optical fibers and hence prevent degradation of the first and second optical fibers. Moreover, by precisely aligning the incident laser light with the second optical fiber according to the adjustment of the amount of negative dispersion in the negative dispersion optical system, the balance between the nonlinear effects in the first and second optical fibers is maintained, so that the microscope body can output the ultrashort pulse laser light. The multiphoton excitation effect in the specimen is thus improved, and hence a bright fluorescence image can be acquired.

In the configuration described above, the laser microscope may further include an incident position storage unit that stores incident positions set by the first and second aligners corresponding to different wavelengths of the ultrashort pulse laser light outputted from the laser light source and/or the amount of positive dispersion in the microscope body.

In such a configuration, when the wavelength of the ultrashort pulse laser light outputted from the laser light source is changed or the amount of positive dispersion in the microscope body is changed, the incident positions stored in the incident position storage unit corresponding to this change are read out and adjusted to the incident positions set by the first and second aligners. In this way, the coupling efficiency of the laser light can be improved in a simple and quick manner.

In the first aspect described above, the laser microscope may further include a first output power detector that detects the output power of the laser light outputted from the first optical fiber, a first aligner that adjusts the position where the ultrashort pulse laser light is incident on the first optical fiber based on the value detected by the first output power detector, a second output power detector that detects the output power of the laser light outputted from the second optical fiber, and a second aligner that adjusts the position where the laser light is incident on the second optical fiber based on the value detected by the second output power detector.

In such a configuration, when the value detected by the first output power detector shows that the output power of the laser light from the first optical fiber decreases, the first aligner can be operated to maintain the output power detected by the first output power detector. Similarly, when the value detected by the second output power detector shows that the output power of the laser light from the second optical fiber decreases, the second aligner can be operated to maintain the output power detected by the second output power detector. In this way, the positions where the laser light is incident on the first and second optical fibers can be automatically adjusted, so that high-power delivery can be maintained in a more precise manner.

In the configuration described above, the laser microscope may further include an incident position storage unit that stores the incident positions set by the first and second aligners corresponding to the wavelength of the ultrashort pulse laser light outputted from the laser light source and/or the amount of positive dispersion in the microscope body.

In such a configuration, when the wavelength of the ultrashort pulse laser light outputted from the laser light source is changed or the amount of positive dispersion in the microscope body is changed, the incident positions stored in the incident position storage unit are first read out and adjusted to the incident positions set by the first and second aligners. In this way, the coupling efficiency of the laser light can be improved in a simple and quick manner. Then, when the positions where the laser light is incident become inappropriate, the first and second aligners can be operated to automatically adjust the positions where the laser light is incident on the first and second optical fibers, so that high-power delivery can be maintained in a more precise manner.

In the configuration described above, or when the configuration described above further includes the incident position storage unit, the first aligner may adjust the position where the ultrashort pulse laser light is incident on the first optical fiber when the output power of the laser light detected by the first output power detector is smaller than or equal to a predetermined threshold value, and the second aligner may adjust the position where the laser light is incident on the second optical fiber when the output power of the laser light detected by the second output power detector is smaller than or equal to a predetermined threshold value.

In such a configuration, the output power of the ultrashort pulse laser light which irradiates the specimen from the microscope body is always stable, allowing stable fluorescence observation.

Any of the laser microscopes described above including the incident position storage unit may further include a shutter that blocks the ultrashort pulse laser light from entering the first optical fiber, the shutter used when the first or second aligner makes adjustment to achieve any of the incident positions stored in the incident position storage unit.

When the first or second aligner makes adjustment to achieve any of the incident positions stored in the incident position storage unit, the laser light is actually not required to be incident on the fiber.

In such a configuration, during the adjustment performed by the aligner, it is possible to prevent degradation of the optical fiber due to the laser light incident on a position deviated off the core of the optical fiber.

In the present invention described above, the laser microscope may further include a negative dispersion value storage unit that stores amounts of negative dispersion in the negative dispersion optical system corresponding to different wavelengths of the ultrashort pulse laser light outputted from the laser light source and/or amounts of positive dispersion in the microscope body.

In such a configuration, when the wavelength of the ultrashort pulse laser light outputted from the laser light source is changed or the amount of positive dispersion in the microscope body is changed, the amount of negative dispersion stored in the negative dispersion value storage unit is first read out and then the amount of negative dispersion to be caused by the negative dispersion optical system is adjusted. In this way, the balance between the nonlinear effects in the first and second optical fibers is maintained in a simple and quick manner, and hence appropriate ultrashort pulse laser light can irradiate the specimen.

In any of the laser microscopes described above, the microscope body may include an objective lens that irradiates the specimen with the ultrashort pulse laser light and an objective output pulse detector that detects the pulse width of the ultrashort pulse laser light outputted from the objective lens or the intensity of fluorescence generated at the specimen, and the negative dispersion optical system may adjust the amount of negative dispersion based on the value detected by the objective output pulse detector.

In such a configuration, when the pulse width of the ultrashort pulse laser light outputted from the objective lens that is detected by the objective output pulse detector or the intensity of fluorescence generated at the specimen is inappropriate, the amount of negative dispersion imparted from the negative dispersion optical system is adjusted accordingly. In this way, short pulse width and high power of the ultrashort pulse laser light which irradiates the specimen from the objective lens can be maintained, so that the multiphoton excitation effect efficiently occurs and hence a bright fluorescence image can be acquired.

In any of the laser microscopes described above, the negative dispersion optical system may include a pair of gratings or a pair of prisms.

In such a configuration, by adjusting the grating distance between the pair of gratings or the prism distance between the pair of prisms, the amount of negative dispersion can be easily adjusted.

In any of the laser microscopes described above, each of the first and second optical fibers may be a single-mode fiber.

In such a configuration, it is possible to prevent generation of the another mode in the first and second optical fibers and easily control the pulse width of the ultrashort pulse laser light to be delivered.

In the configuration described above, each of the first and second optical fibers may be a polarization-maintaining single-mode fiber.

Compared to the case where a random polarization-type optical fiber is used, such a configuration eliminates the need for associated devices, such as a $\lambda/4$ plate, a $\lambda/2$ plate, and mechanisms for rotating the $\lambda/4$ plate and the $\lambda/2$ plate, for adjusting the polarization direction at the output port of each of the fibers. It is therefore possible to easily set the polarization of the laser light outputted from the first and second optical fibers.

In the configuration described above, each of the first and second optical fibers may be a photonic crystal fiber.

In such a configuration, ultrashort pulse laser light in a broad wavelength band can be delivered in a single mode. Further, the diameter of the fiber can be larger, so that the nonlinear effects in the first and second optical fibers can be reduced, and hence the pulse width of the laser light to be delivered can be easily controlled.

In any of the laser microscopes described above, the laser microscope may further include a collimator lens that includes at least one lens and substantially collimates the laser light outputted from the first optical fiber and a collimator lens adjuster that adjusts the position in the optical axis direction of the lens that forms the collimator lens according to the change in wavelength of the ultrashort pulse laser light outputted from the laser light source.

In such a configuration, the collimator lens adjuster is operated to adjust the position in the optical axis direction of the lens that forms the collimator lens according to change in wavelength of the ultrashort pulse laser light, so that the coupling efficiency of the second optical fiber can be improved. Therefore, the laser light outputted from the first optical fiber can be used without loss and hence high-power delivery is achieved.

In any of the laser microscopes described above, the laser microscope may further include a beam shaping optical system disposed between the output port of the second optical fiber and the microscope body, the beam shaping optical system including at least one lens that adjusts the beam diameter and beam divergence of the laser light incident on the microscope body, and a lens position adjustment system that adjusts the position in the optical axis direction of the lens that forms the beam shaping optical system according to the change in wavelength of the ultrashort pulse laser light from the laser light source.

In such a configuration, the lens position adjustment system is operated to adjust the position in the optical axis direction of the lens that forms the beam shaping optical system according to the change in wavelength of the ultrashort pulse laser light, so that the beam diameter and beam divergence of the laser light incident on the microscope body can be adjusted. Therefore, the numerical aperture of the ultrashort pulse laser light which irradiates the specimen can be sufficiently large, and hence the multiphoton excitation efficiency and the resolution can be improved.

In any of the laser microscopes described above, the laser microscope may further include an intensity modulator disposed either between the laser light source and the first optical fiber or between the second optical fiber and the microscope body, the intensity modulator modulating the intensity of the laser light.

In such a configuration, the intensity modulator disposed at a position other than in the region between the first and second optical fibers can maintain the balance between the nonlinear effects in the two fibers, stabilizes the stable pulse width of the ultrashort pulse laser light outputted from the microscope body to the specimen, and modulates the output power.

In any of the laser microscopes described above, the laser microscope may further include a peak intensity adjustment system disposed between the laser light source and the first optical fiber, the peak intensity adjustment system adjusting the peak intensity of the laser light to be incident on the first optical fiber.

In such a configuration, by adjusting the peak intensity adjustment system according to the delivery efficiency between the first and second optical fibers, the balance between the nonlinear effects in the two fibers can be always maintained. Further, even when the amount of positive dispersion in the microscope body disposed downstream of the second optical fiber is relatively small, such shortage can be compensated and hence the ultrashort pulse laser light having a desired pulse width can irradiate the specimen.

In any of the laser microscopes described above, the second optical fiber may connect the microscope body to a light source unit including the laser light source, the first optical fiber, and the negative dispersion optical system.

In such a configuration, bending the second optical fiber allows easy positioning of the microscope body relative to the light source unit, and hence the advantage in layout can be increased.

According to the present invention, ultrashort pulse laser light can irradiate the specimen from the microscope body even when the wavelength is changed or the amount of positive dispersion in the microscope body is changed, so that the multiphoton excitation phenomenon efficiently occurs and hence a bright fluorescence image can be acquired in an advantageous manner.

DETAILED DESCRIPTION OF THE INVENTION

Figure 1:
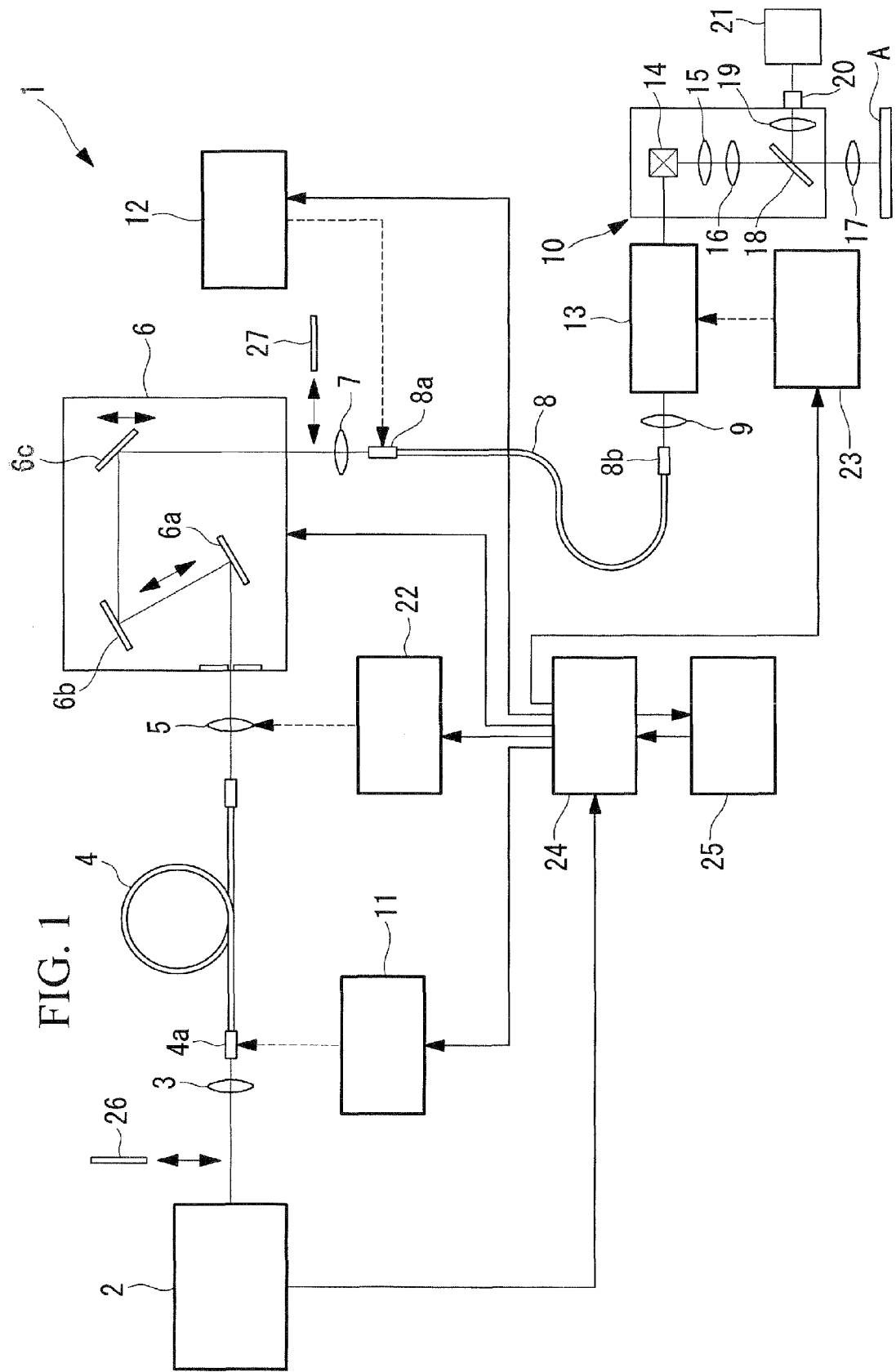
FIG. 1 is a block diagram showing the overall configuration of a laser microscope according to a first embodiment of the present invention.

A laser microscope 1 according to a first embodiment of the present invention will be described below with reference to FIG. 1.

The laser microscope 1 according to this embodiment is a multiphoton excitation laser microscope 1 that produces a multiphoton excitation effect in a specimen A. The microscope 1 includes, as shown in FIG. 1, a laser light source 2 that outputs ultrashort pulse laser light, sequentially followed by a coupling lens 3, a first optical fiber 4, a collimator lens 5, a negative dispersion optical system 6, a coupling lens 7, a second optical fiber 8, a collimator lens 9, and a microscope body 10.

The laser light source 2 outputs ultrashort pulse laser light, for example, having a tunable wavelength range from 700 to 1000 nm and a pulse width of a picosecond at the longest.

Each of the first and second optical fibers 4 and 8 is a polarization-maintaining photonic crystal fiber, and alignment systems (first and second aligners) 11 and 12 are provided at the input ports 4a and 8a of the first and second optical fibers 4 and 8. The alignment systems 11 and 12 adjust the positions of the input ports 4a and 8a on which laser light is incident. Both the first and second optical fibers 4 and 8 have a positive dispersion characteristic by which the propagating laser light is positively chirped.

The alignment systems 11 and 12 can move the input ports 4a and 8a of the optical fibers 4 and 8, for example, relative to the fixed coupling lenses 3 and 7 in the optical axis direction of the optical fibers and in directions perpendicular thereto in a three-dimensional manner. The thus configured alignment systems 11 and 12 adjust the input ports 4a and 8a of the optical fibers 4 and 8 by moving them in such a way that the cores of the input ports 4a and 8a of the optical fibers 4 and 8 are located precisely at the focusing positions of the coupling lenses 3 and 7.

The collimator lens 5 includes one or more lenses, at least one of which is movable in the optical axis direction. The collimator lens 5 is connected to a lens position adjustment system (collimator lens adjuster) 22. The lens position adjustment system 22 is operated to locate the collimator lens 5 at a predetermined position in the optical axis direction, so that the laser light outputted from the first optical fiber 4 is collected, is substantially collimated, and enters the following negative dispersion optical system 6.

The negative dispersion optical system 6 includes a pair of gratings 6a and 6b having the distance therebetween being adjustable, and a mirror 6c that adjusts the output position of the laser light outputted from the pair of gratings 6a and 6b. The amount of negative dispersion and hence how much the laser light is negatively chirped can be adjusted by adjusting the distance between the pair of gratings 6a and 6b. The mirror 6c adjusts the output position and angle of the laser light outputted from the negative dispersion optical system 6 in such a way that they stay unchanged even when the movement of the pair of gratings 6a and 6b alters the light path.

The microscope body 10 includes a beam shaping optical system 13 that adjusts the beam diameter and beam divergence of the laser light outputted from the second optical fiber 8 and substantially collimated by the collimator lens 9, a scanner 14 that two-dimensionally scans the laser light that has passed through the beam shaping optical system 13 by which the beam diameter and beam divergence have been adjusted, a pupil projection lens 15, a focusing lens 16, an objective lens 17 that focuses the ultrashort pulse laser light substantially collimated by the focusing lens 16, irradiates the specimen with the focused light, and collects the fluorescence generated at the specimen A, a dichroic mirror 18 that separates the fluorescence collected by the objective lens 17 from the light path of the ultrashort pulse laser light, a collector lens 19 that collects the fluorescence separated by the dichroic mirror 18, a photodetector 20 that detects the collected fluorescence, and a display unit 21 that constructs and displays a fluorescence image based on the fluorescence detected by the photodetector 20.

The beam shaping optical system 13 includes at least one lens that is movable in the optical axis direction. By using a lens position adjustment system 23 to locate the lens at a predetermined position, the beam shaping optical system 13 causes laser light to have a beam diameter and a beam divergence adjusted to fill the pupil of the objective lens 17 to be incident on the scanner 14.

The negative dispersion optical system 6, the alignment systems 11 and 12, and the lens position adjustment systems 22 and 23 are connected to a controller (negative dispersion value adjuster) 24 that adjusts the above components connected thereto. The controller 24 is connected to a storage unit (an incident position storage unit and a negative dispersion value storage unit) 25. The storage unit 25 stores the amount of negative dispersion produced by the negative dispersion optical system 6, the positions of the input ports 4a and 8a of the optical fibers 4 and 8, the positions of the lenses that form the collimator lens 5 and the beam shaping optical system 13 which correspond to different wavelengths of the ultrashort pulse laser light outputted from the laser light source 2.

Therefore, upon the determination of the wavelength of the ultrashort pulse laser light outputted from the laser light source 2, the controller 24 operates the search in the storage unit 25, reads the values for the negative dispersion optical system 6, the alignment systems 11 and 12, and the lens position adjustment systems 22 and 23 that correspond to this determined wavelength, and adjusts the negative dispersion optical system 6, the alignment systems 11 and 12, and the lens position adjustment systems 22 and 23 based on the adjustment values that have been read out.

Shutters 26 and 27 are removably provided upstream of the coupling lenses 3 and 7 in the light path, respectively. By inserting the shutters 26 and 27 in the light path, the laser light from the laser light source 2 is blocked from entering the coupling lenses 3 and 7, whereas by removing the shutters 26 and 27 from the light path, the laser light is allowed to enter the coupling lenses 3 and 7.

When the alignment systems 11 and 12 and the lens position adjustment systems 22 and 23 are in adjustment operation, the shutters 26 and 27 are inserted in the light path in response to a command from the controller 24 to block the laser light from entering the coupling lenses 3 and 7. After the adjustment operation is completed, the shutters 26 and 27 are removed from the light path in response to a command from the controller 24 to allow the passage of the laser light.

The advantageous effect of the thus configured microscope 1 according to this embodiment will be described below.

In the microscope 1 according to this embodiment, the ultrashort pulse laser light outputted from the laser light source 2 passes through the coupling lens 3, is incident on the input port 4a of the first optical fiber 4, propagates through the first optical fiber 4, and is substantially collimated by the collimator lens 5.

The laser light, while propagating through the first optical fiber 4, is positively chirped due to the positive dispersion characteristic of the fiber. The laser light in this state enters the negative dispersion optical system 6, is chirped in the opposite direction, that is, negatively chirped, according to the amount of negative dispersion determined by the distance between the pair of gratings 6a and 6b, passes through the coupling lens 7, is incident on the input port 8a of the second optical fiber 8, propagates through the second optical fiber 8, and is substantially collimated by the collimator lens 9.

While the laser light propagates through the second optical fiber 8, the positive dispersion characteristic of the fiber gradually cancels the negatively chirped state.

The laser light outputted from the second optical fiber 8 is substantially collimated by the collimator lens 9, passes through the beam shaping optical system 13 where the beam diameter and beam divergence of the laser light are adjusted, is scanned by the scanner 14 in a two-dimensional manner, is focused by the pupil projection lens 15, the focusing lens 16, and the objective lens 17, and irradiates the specimen A.

The optical system disposed downstream of the output port 8*b* of the second optical fiber 8, that is, the collimator lens 9, the beam shaping optical system 13, the scanner 14, the pupil projection lens 15, the focusing lens 16, the dichroic mirror 18, and the objective lens 17, as a whole, positively disperses the laser light.

That is, the ultrashort pulse laser light outputted from the laser light source 2 is positively chirped and hence the pulse width increases, while propagating through the first optical fiber 4, due to the positive dispersion characteristic of the fiber. However, the laser light is negatively chirped and hence the pulse width increases, while passing through the negative dispersion optical system 6, due to its large negative dispersion characteristic. Then, the laser light is returned from the negatively chirped state while the laser light propagates through the second optical fiber 8 again due to the positive dispersion characteristic of the fiber. Further, because the laser light passes through the optical system downstream of the second optical fiber 8, due to the positive dispersion characteristic of the optical system, when the ultrashort pulse laser light is outputted from the tip of the objective lens 17, the ultrashort pulse laser light is restored to its pulse width when it was outputted from the laser light source 2.

As a result, a multiphoton excitation phenomenon occurs at the position in the specimen A where the ultrashort pulse laser light is focused. The generated fluorescence is collected by the objective lens 17, separated by the dichroic mirror 18, and detected by the photodetector 20. Then, a two-dimensional fluorescence image is displayed on the display unit 21 based on the scanning position of the scanner 14 and the fluorescence intensity detected by the photodetector 20.

In the thus configured microscope 1 according to this embodiment, when the wavelength of the ultrashort pulse laser light outputted from the laser light source 2 is changed, the controller 24 is operated to first insert the shutters 26 and 27 in the light path.

Since the change in the wavelength of the ultrashort pulse laser light causes the optical axes of the optical components to become misaligned, the shutters 26 and 27 are inserted in the light path to prevent the laser light from being incident on positions outside the cores of the optical fibers 4 and 8 and hence prevent degradation of the optical fibers 4 and 8.

Then, adjustment values stored in the storage unit 25 are read out based on the modified wavelength, and the negative dispersion optical system 6, the alignment systems 11 and 12, and the lens position adjustment systems 22 and 23 are adjusted.

Since the amount of negative dispersion is adjusted in the negative dispersion optical system 6 according to the change in wavelength, the balance between the nonlinear effect in the first optical fiber 4 and the nonlinear effect in the second optical fiber 8 is maintained, and hence the pulse width of the ultrashort pulse laser light which irradiates the specimen A from the microscope body 10 can be maintained at a sufficiently small value.

Further, since the alignment systems 11 and 12 are operated in response to the change in wavelength to precisely locate the cores at the input ports 4*a* and 8*a* of the optical fibers 4 and 8 at the focusing positions of the coupling lenses 3 and 7, loss of the laser light is prevented and high-power delivery can be performed due to the improvement of the coupling efficiency. Such alignment also prevents degradation of the optical fibers 4 and 8 due to the deviation of the positions where the laser light is focused by the coupling lenses 3 and 7 away from the cores of the optical fibers 4 and 8.

In particular, the change in the setting of the negative dispersion optical system 6 prevents the shift of the laser light away from the position where it is incident on the input port 8*a* of the second optical fiber 8 and hence maintains the balance between the nonlinear effects in the two optical fibers 4 and 8, so that the objective lens 17 can reliably output the ultrashort pulse laser light.

By adjusting the collimator lens 5 according to the change in wavelength, the coupling efficiency at the second optical fiber 8 can be further improved.

Further, by adjusting the beam shaping optical system 13 according to the change in wavelength, laser light having a beam diameter and a beam divergence set to fill the pupil of the objective lens 17 can be incident on the scanner 14, ensuring a sufficiently large numerical aperture of the ultrashort pulse laser light to be outputted from the objective lens 17 and hence allow improvement in resolution.

Therefore, a multiphoton excitation phenomenon is efficiently generated in the specimen A, and hence a bright fluorescence image is acquired in an advantageous manner.

According to this embodiment, the storage unit 25 stores adjustment values for the negative dispersion optical system 6, the alignment systems 11 and 12, and the lens position adjustment systems 22 and 23 corresponding to different wavelengths of the ultrashort pulse laser light. Since these adjustment values are stored in the storage unit 25, quick adjustment of the above components is enabled when the wavelength is changed.

In this embodiment, while the negative dispersion optical system 6, the alignment systems 11 and 12, and the lens position adjustment systems 22 and 23 are adjusted when the wavelength of the ultrashort pulse laser light outputted from the laser light source 2 is changed, the storage unit 25 may also store an adjustment value according to the change in the amount of positive dispersion in the microscope body 10. For example, when the objective lens 17 in the microscope body 10 is switched to another and hence the amount of positive dispersion in the microscope body 10 is changed, it is necessary to change the setting of the negative dispersion optical system 6 so as to compensate this change and adjust the alignment systems 11 and 12 and the lens position adjustment systems 22 and 23.

In this way, even when the objective lens 17 is switched to another, the balance between the nonlinear effect in the first optical fiber 4 and the nonlinear effect in the second optical fiber 8 can be maintained, and hence the pulse width of the ultrashort pulse laser light which irradiates the specimen A from the microscope body 10 can be maintained at a sufficiently small value. It is further possible to prevent degradation of the optical fibers 4 and 8, achieve high-power delivery, and perform fluorescence observation at high resolution.

In this embodiment, an output power modulator (not shown) may be disposed at a position other than the region between the first optical fiber 4 and the second optical fiber 8. Examples of the output power modulator may be an acousto-optic device, such as an AOTF, an electro-optic device, an ND filter, an attenuator, and a variable reflectance mirror. It is therefore possible to modulate the output power while maintaining the balance between the nonlinear effect in the first optical fiber 4 and the nonlinear effect in the second optical fiber 8 and providing a stable pulse width of the ultrashort pulse laser light outputted from the objective lens 17.

When the amount of positive dispersion in the optical system downstream of the output port of the second optical fiber 8 is insufficient, an arbitrary optical element providing additional positive dispersion may be added to optimize the amount of dispersion.

Although this embodiment has been described with reference to the alignment systems 11 and 12 configured to move the input ports 4a and 8a of the optical fibers 4 and 8 relative to the fixed coupling lenses 3 and 7 in a three-dimensional manner, the alignment systems 11 and 12 may alternatively be configured to move both the coupling lenses 3 and 7 and the input ports 4a and 8a of the optical fibers 4 and 8 integrally in directions intersecting the optical axis and move one of them relative to the other in the optical axis direction. Further, in addition to moving the input ports 4a and 8a of the optical fibers 4 and 8 in a three-dimensional manner, the input ports 4a and 8a of the optical fibers 4 and 8 may also be moved integrally with the coupling lenses 3 and 7 in directions perpendicular to the optical axis.

In this embodiment, although each of the optical fibers 4 and 8 is a polarization-maintaining photonic crystal fiber, each of the optical fibers 4 and 8 may alternatively be a random polarization-type single-mode fiber. In this case, the polarization direction may be adjusted by disposing a λ/4 plate and a λ/2 plate at the output port of each of the optical fibers 4 and 8 and rotating the λ/4 and λ/2 plates around the optical axis.

Next, a microscope 30 according to a second embodiment of the present invention will be described below with reference to FIG. 2.

In the description of this embodiment, the portions configured in the same manner as those in the microscope 1 according to the first embodiment described above have the same reference numerals, and the description thereof will be omitted.

The microscope 30 according to this embodiment differs from the microscope 1 according to the first embodiment in that the microscope 30 further includes beam splitters 31 and 32 that split part of the laser light outputted from the output ports 4b and 8b of the first and second optical fibers 4 and 8, and output power detectors (first and second output power detectors) 33 and 34 that detect the intensities of the laser lights split by the beam splitters 31 and 32, and that the alignment systems 11 and 12 are controlled based on the values detected by the output power detectors 33 and 34.

Figure 2:
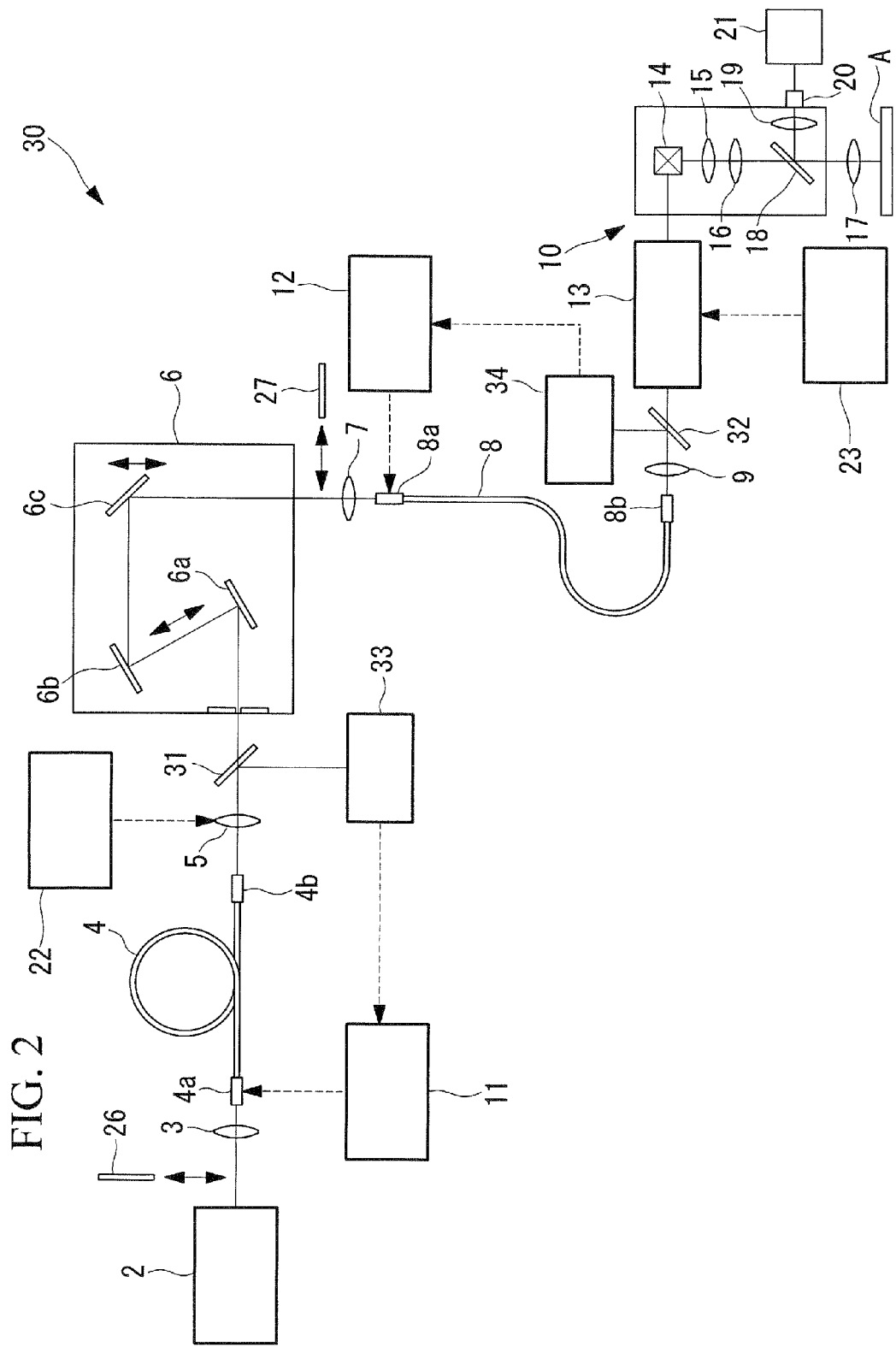
FIG. 2 is a block diagram showing the overall configuration of a laser microscope according to a second embodiment of the present invention.

In FIG. 2, the controller 24 and the storage unit 25 described in the first embodiment are omitted in order to simplify the description.

When the wavelength of the ultrashort pulse laser light outputted from the laser light source 2 is changed or when the objective lens 17 is switched to another in the microscope body 10, the controller 24 is operated to read out and set adjustment values stored in the storage unit 25 and thus the alignment systems 11 and 12 adjust the input ports 4a and 8a of the optical fibers 4 and 8 at the predetermined positions. On the other hand, the output power detectors 33 and 34 are operated to continuously monitor the intensities of the laser light outputted from the output ports 4b and 8b of the optical fibers 4 and 8. When the output values detected by the output power detectors 33 and 34 become smaller than predetermined threshold values, the alignment systems 11 and 12 adjust the positions of the input ports 4a and 8a of the optical fibers 4 and 8 in such a way that the values are maximized.

In such a configuration, when the wavelength is changed or when the objective lens 17 is switched to another, adjustment values stored in the storage unit 25 can be quickly used for adjustment. Further, continuous monitoring performed by the output power detectors 33 and 34 allows detection of misaligned optical axes and correction for the amount of change.

It is therefore possible to prevent inconveniences such as loss of light and degradation of the optical fibers 4 and 8 caused by deviation of the focused positions of the laser light away from the cores of the optical fibers 4 and 8.

Figure 3:
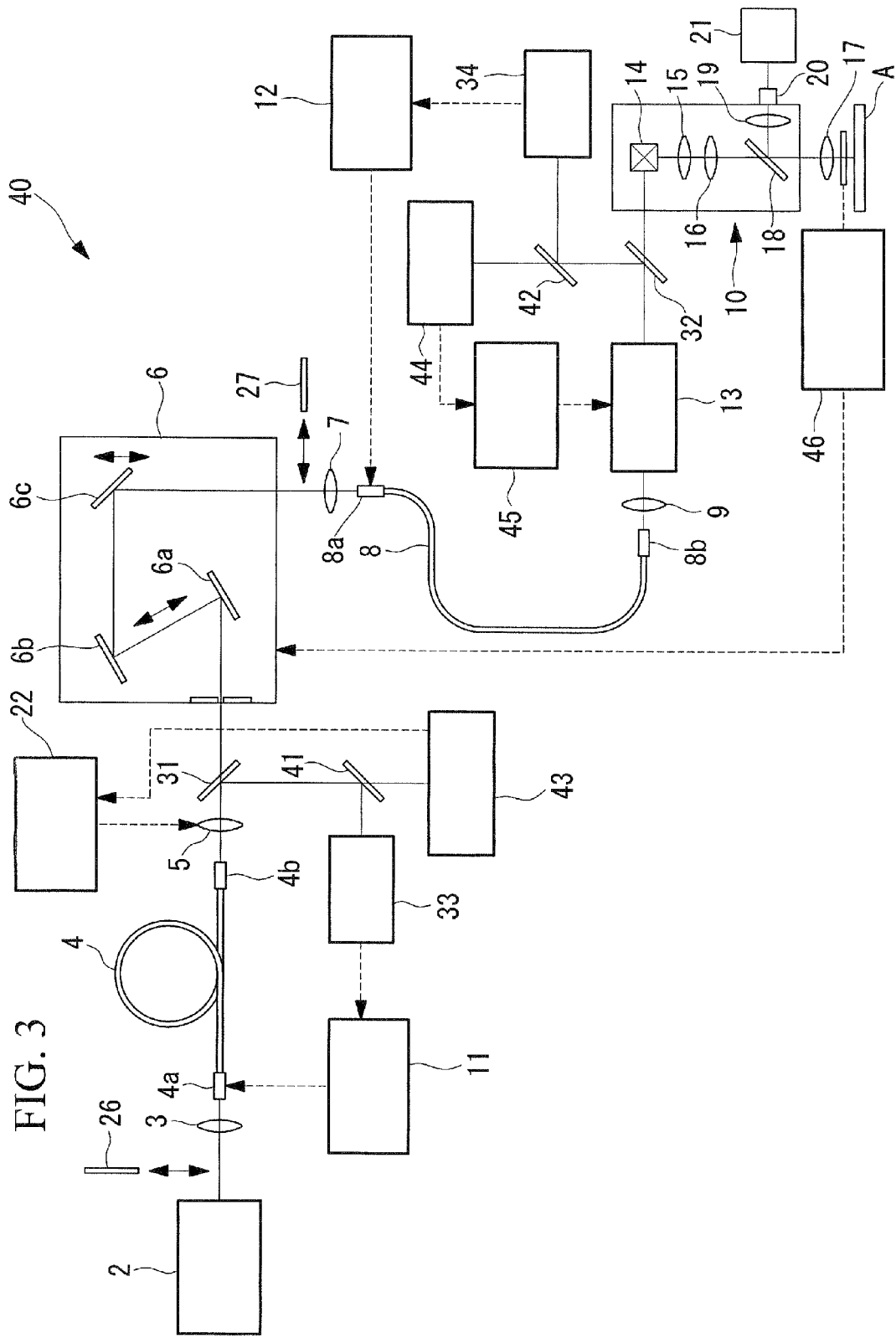
FIG. 3 is a block diagram showing the overall configuration of a laser microscope according to a third embodiment of the present invention.

Next, a microscope 40 according to a third embodiment of the present invention will be described below with reference to FIGS. 3 and 4.

In the description of this embodiment, the portions configured in the same manner as those in the microscope 30 according to the second embodiment described above have the same reference numerals, and the description thereof will be omitted.

The microscope 40 according to this embodiment differs from the microscope 30 according to the second embodiment in that the microscope 40 further includes beam splitters 41 and 42 that further split the laser light split by the beam splitters 31 and 32, and beam profilers 43 and 44, such as CCDs, which detect the beam profiles of the laser light split by the beam splitters 41 and 42, and that the lens position adjustment systems (collimator lens adjusters) 22 and 45 adjust the collimator lens 5 and the beam shaping optical system 13 based on the value detected by the beam profilers 43 and 44. The laser microscope 40 also differs from the microscope 30 in that the microscope 40 further includes a pulse width/fluorescence intensity detector 46 that detects the pulse width of the ultrashort pulse laser light outputted from the objective lens 17 or the fluorescence intensity, and that the negative dispersion optical system 6 is controlled according to the detected value obtained from the detector 46.

Figure 4:
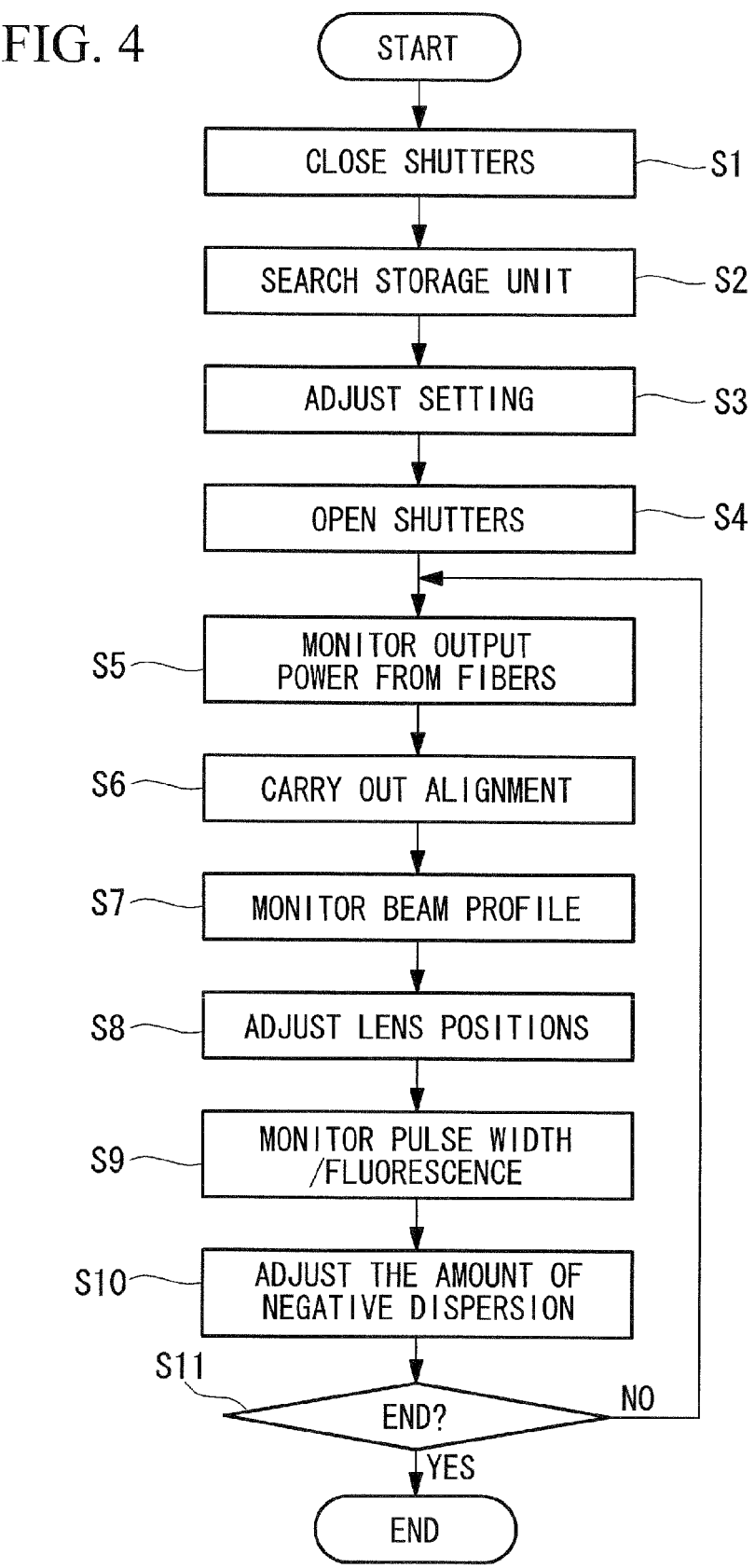
FIG. 4 is a flowchart for explaining the operation of the laser microscope shown in FIG. 3.

When the wavelength of the ultrashort pulse laser light is changed before the thus configured microscope 40 according to this embodiment is used to observe the specimen A, the controller 24 first inserts the shutter 26 and 27 in the light path (step S1), then operates the search in the storage unit 25 based on the modified wavelength (step S2), and sets the alignment systems 11 and 12, the lens position adjustment systems 22 and 45, and the negative dispersion optical system 6 to have the adjustment values which are stored corresponding to the wavelength (step S3), as shown in FIG. 4.

In this state, the following actions are carried out: the shutter 26 and 27 are opened (step S4); the detected values obtained from the output power detectors 33 and 34 are monitored (step S5); and the alignment systems 11 and 12 make fine adjustments in such a way that the output values detected by from the output power detectors 33 and 34 are maximized (step S6). Further, the beam profilers 43 and 44 are operated to monitor the beam shapes of the laser light outputted from the output ports 4b and 8b of the optical fibers 4 and 8 (step S7), and the lens position adjustment systems 22 and 45 make fine adjustments so that the beam has a desired shape (step S8). Moreover, the detector 46 monitors the pulse width of the ultrashort pulse laser light outputted from the objective lens 17 or the fluorescence intensity (step S9), and the positions of the pair of gratings 6a and 6b and the mirror 6c in the negative dispersion optical system 6 undergo fine adjustments so that the pulse width or the fluorescence intensity becomes a desired value (step S10). Then, the steps S5 to S10 are repeated until the adjustment is completed (step S11).

In the thus configured microscope 40 according to this embodiment, since the pulse width of the ultrashort pulse laser light outputted from the objective lens 17 is monitored and the amount of negative dispersion in the negative dispersion optical system 6 is adjusted so that a desired pulse width is provided, there are the advantages that the ultrashort pulse laser light can be more reliably achieved and the multiphoton excitation efficiency in the specimen A can be improved.

Next, a microscope 50 according to a fourth embodiment of the present invention will be described below with reference to FIGS. 5 and 6.

In the description of this embodiment, the portions configured in the same manner as those in the microscope 30 according to the second embodiment described above have the same reference numerals, and the description thereof will be omitted.

Figure 5:
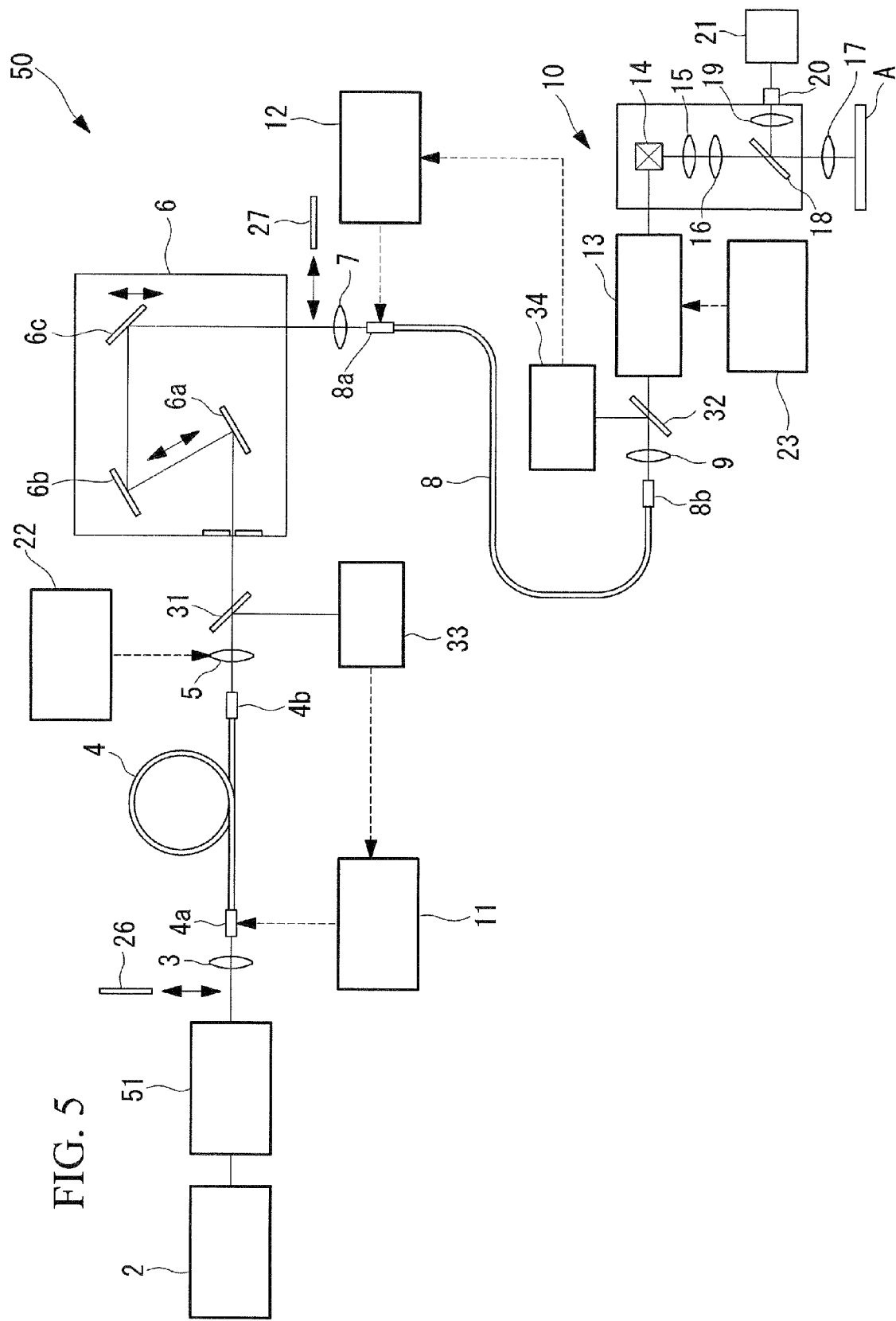
FIG. 5 is a block diagram showing the overall configuration of a laser microscope according to a fourth embodiment of the present invention.

The microscope 50 according to this embodiment differs from the microscope 30 according to the second embodiment in that the microscope 50 further includes a peak intensity adjustment system 51 between the laser light source 2 and the first optical fiber 4 as shown in FIG. 5.

Figure 6A:
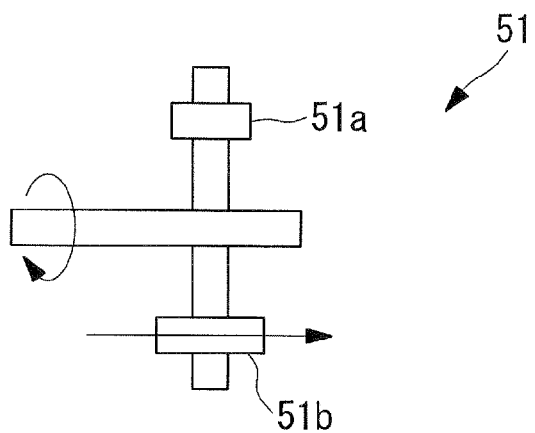
FIG. 6A shows an example of a peak intensity adjustment system in the laser microscope shown in FIG. 5.
Figure 6B:
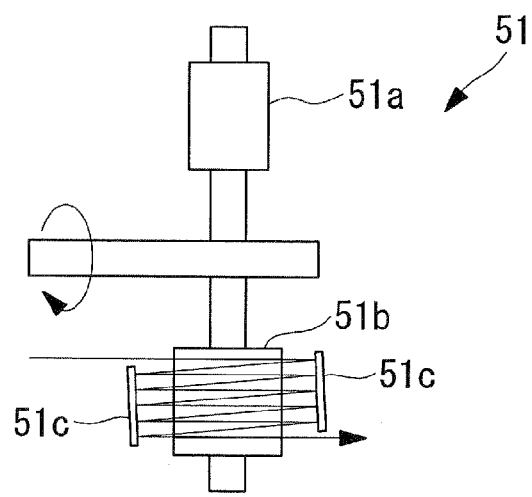
FIG. 6B shows another example of the peak intensity adjustment system in the laser microscope shown in FIG. 5.
Figure 6C:
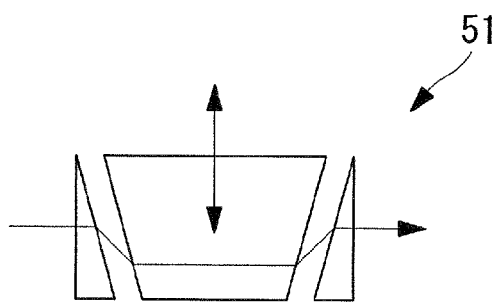
FIG. 6C shows another example of the peak intensity adjustment system in the laser microscope shown in FIG. 5.

The peak intensity adjustment system 51 changes the amount of positive dispersion to be imparted to the ultrashort pulse laser light so as to adjust how much the ultrashort pulse laser light is positively chirped. The peak intensity adjustment system 51 is configured, for example, as shown in FIGS. 6A and 6B, so that one of two positive dispersion elements 51a and 51b having different element lengths is chosen to be in the light path. For example, in FIGS. 6A and 6B, ZnSe crystals 51a and 51b having different crystal lengths are switched by a revolving unit. FIG. 6A shows a single-pass version, and FIG. 6B shows a multi-pass version. In FIG. 6B, 51c denotes a mirror. As shown in FIG. 6C, a prism version may be used.

The peak intensity adjustment system 51 may adjust the peak intensity, for example, according to the ratio between the detection signals from the output power detectors 33 and 34. When the peak intensity of the ultrashort pulse laser light incident on the first optical fiber 4 is changed, the distance between the pair of gratings 6a and 6b and the position of the mirror 6c in the negative dispersion optical system 6 are adjusted accordingly.

In this way, the balance between the nonlinear effect in the first optical fiber 4 and the nonlinear effect in the second optical fiber 8 can be maintained, and hence the ultrashort pulse laser light can be outputted from the objective lens 17. In this case, since the peak intensity adjustment system 51 positively chirps the laser light to a certain extent, there is the advantage that the amount of positive dispersion performed in the microscope body 10 and the like disposed downstream of the second optical fiber 8 can be reduced.

Figure 7:
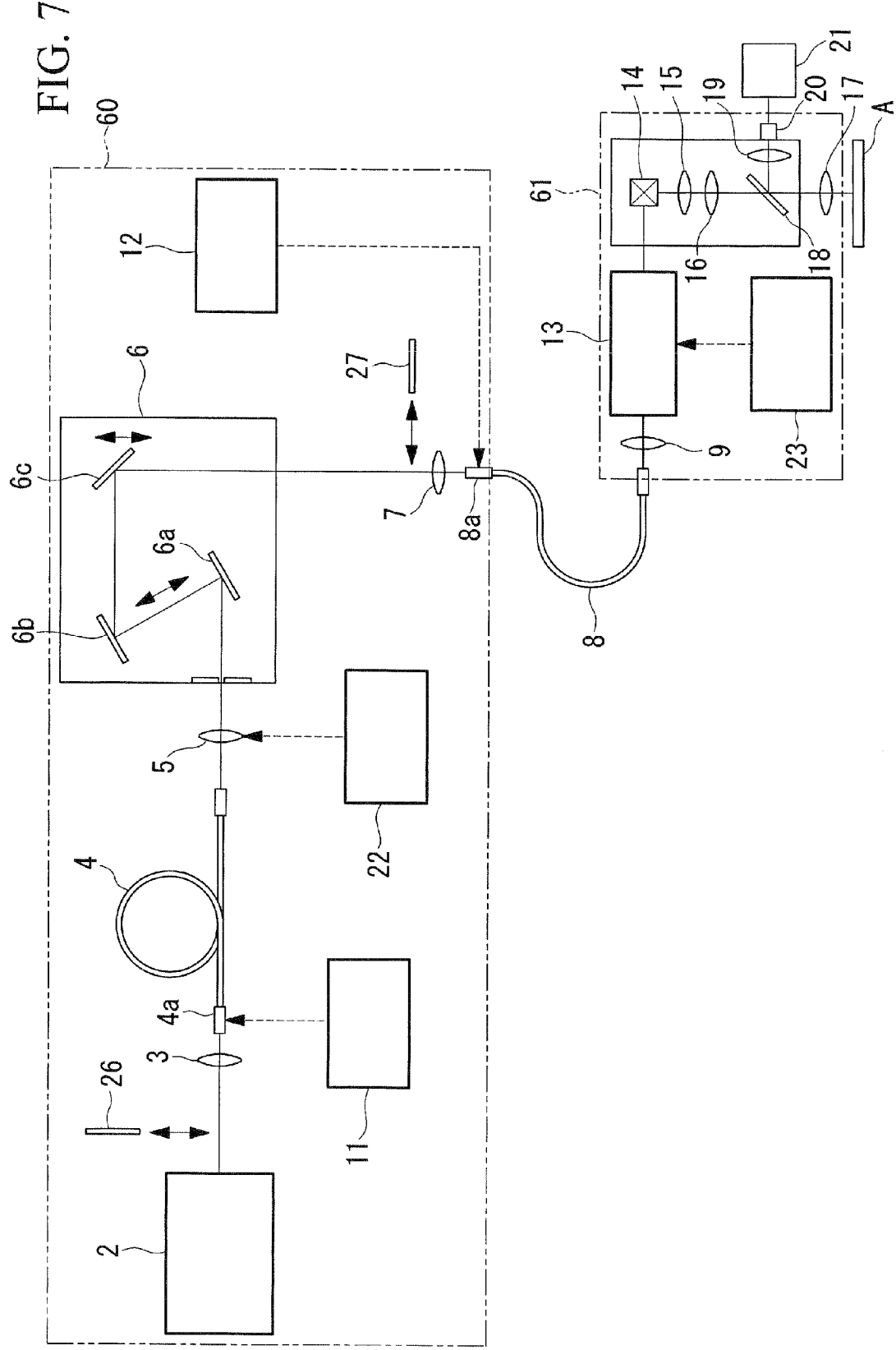
FIG. 7 is a block diagram showing an exemplary configuration of a laser microscope according to the present invention.

In each of the above embodiments, as shown in FIG. 7 for example, the upstream side of the second optical fiber 8 can be considered as a light source unit 60, and the downstream side of the second optical fiber 8 can be considered as a microscope body unit (microscope body) 61.

That is, in such a configuration, the microscope body unit 61 can be disposed at an arbitrary position relative to the light source unit 60 by bending the second optical fiber 8. Such a configuration provides the advantages of easy positioning of the microscope body unit 61 and improvement in the advantage in layout.

What is claimed is:

1. A laser microscope comprising:
a laser light source that outputs ultrashort pulse laser light;
a first optical fiber through which the ultrashort pulse laser light outputted from the laser light source propagates while being positively chirped;
a negative dispersion optical system that negatively chirps the laser light that has propagated through the first optical fiber;
a second optical fiber through which the laser light that has passed through the negative dispersion optical system propagates while being positively chirped; and
a microscope body that further positively chirps the laser light that has propagated through the second optical fiber and that irradiates a specimen with the resultant non-chirped ultrashort pulse laser light,
wherein the negative dispersion optical system includes a negative dispersion value adjuster that adjusts an amount of negative dispersion according to a change in wavelength of the ultrashort pulse laser light from the laser light source or a change in an amount of positive dispersion in the microscope body, and
wherein a balance between a nonlinear effect in the first optical fiber and a nonlinear effect in the second optical fiber is maintained with respect to the ultrashort pulse laser light.

2. The laser microscope according to claim 1, further comprising:
a first aligner that adjusts a position where the ultrashort pulse laser light is incident on the first optical fiber; and
a second aligner that adjusts a position where the laser light is incident on the second optical fiber.

3. The laser microscope according to claim 2, further comprising:
an incident position storage unit that stores incident positions set by the first aligner and the second aligner which correspond to different wavelengths of the ultrashort pulse laser light outputted from the laser light source and/or amounts of positive dispersion in the microscope body.

4. The laser microscope according to claim 1, further comprising:
a first output power detector that detects an output power of the laser light outputted from the first optical fiber;
a first aligner that adjusts a position where the ultrashort pulse laser light is incident on the first optical fiber based on a value detected by the first output power detector;
a second output power detector that detects an output power of the laser light outputted from the second optical fiber; and
a second aligner that adjusts a position where the laser light is incident on the second optical fiber based on a value detected by the second output power detector.

5. The laser microscope according to claim 4, further comprising:
an incident position storage unit that stores incident positions set by the first aligner and the second aligner corresponding to different wavelengths of the ultrashort pulse laser light outputted from the laser light source and/or amounts of positive dispersion in the microscope body.

6. The laser microscope according to claim 4,
wherein the first aligner adjusts the position where the ultrashort pulse laser light is incident on the first optical fiber when the output power of the laser light detected by the first output power detector is not greater than a predetermined threshold value, and
wherein the second aligner adjusts the position where the laser light is incident on the second optical fiber when the output power of the laser light detected by the second output power detector is not greater than a predetermined threshold value.

7. The laser microscope according to claim 3, further comprising:
a shutter that blocks the ultrashort pulse laser light from entering the first optical fiber, wherein the shutter is used when the first aligner or the second aligner makes adjustment of an incident position to an incident position stored in the incident position storage unit.

8. The laser microscope according to claim 1, further comprising:
a negative dispersion adjustment value storage unit that stores adjustment values of the negative dispersion adjustment to be performed by the negative dispersion value adjuster in the negative dispersion optical system corresponding to different wavelengths of the ultrashort pulse laser light outputted from the laser light source and/or amounts of positive dispersion in the microscope body.

9. The laser microscope according to claim 1, wherein the microscope body includes an objective lens that irradiates the specimen with the ultrashort pulse laser light, and an objective output pulse detector that detects a pulse width of the ultrashort pulse laser light outputted from the objective lens or an intensity of fluorescence generated at the specimen, and
wherein the amount of negative dispersion in the negative dispersion optical system is adjusted based on a value detected by the objective output pulse detector.

10. The laser microscope according to claim 1, wherein the negative dispersion optical system includes a pair of gratings or a pair of prisms.

11. The laser microscope according to claim 1, wherein each of the first optical fiber and the second optical fiber comprises a single-mode fiber.

12. The laser microscope according to claim 11, wherein each of the first optical fiber and the second optical fiber comprises a polarization-maintaining single-mode fiber.

13. The laser microscope according to claim 11, wherein each of the first optical fiber and the second optical fiber comprises a photonic crystal fiber.

14. The laser microscope according to claim 1, further comprising:
a collimator lens that includes at least one lens and substantially collimates the laser light outputted from the first optical fiber; and
a collimator lens adjuster that adjusts a position in an optical axis direction of the at least one lens of the collimator lens according to the change in wavelength of the ultrashort pulse laser light outputted from the laser light source.

15. The laser microscope according to claim 1, further comprising:
a beam shaping optical system disposed between an output port of the second optical fiber and the microscope body, the beam shaping optical system including at least one lens that adjusts a beam diameter and a beam divergence of the laser light to be incident on the microscope body; and
a lens position adjustment system that adjusts a position of the at least one lens of the beam shaping optical system in an optical axis direction according to the change in wavelength of the ultrashort pulse laser light outputted from the laser light source.

16. The laser microscope according to claim 1, further comprising:
an intensity modulator disposed either on a laser light source side with respect to the first optical fiber or on a second optical fiber side with respect to an objective lens of the microscope body, the intensity modulator modulating an intensity of the laser light.

17. The laser microscope according to claim 1, further comprising:
a peak intensity adjustment system disposed between the laser light source and the first optical fiber, the peak intensity adjustment system adjusting a peak intensity of the laser light to be incident on the first optical fiber.

18. The laser microscope according to claim 1, wherein the second optical fiber connects a light source unit including the laser light source, the first optical fiber, and the negative dispersion optical system to the microscope body.

19. The laser microscope according to claim 5, further comprising:
a shutter that blocks the ultrashort pulse laser light from entering the first optical fiber, wherein the shutter is used when the first aligner or the second aligner makes adjustment of an incident position to an incident position stored in the incident position storage unit.

* * * * *